United States Patent [19]
Cruise et al.

[11] Patent Number: 5,145,416
[45] Date of Patent: Sep. 8, 1992

[54] JACK ASSEMBLY

[75] Inventors: Thomas W. Cruise, Batavia, Ill.; Wayne A. Johnson, Rosemount, Minn.

[73] Assignee: ADC Telecommunications, Inc., Minneapolis, Minn.

[21] Appl. No.: 729,793

[22] Filed: Jul. 10, 1991

Related U.S. Application Data

[63] Continuation of Ser. No. 452,597, Dec. 19, 1989, abandoned.

[51] Int. Cl.$^5$ .............................................. H01R 17/18
[52] U.S. Cl. ...................................... 439/668; 439/714; 439/188
[58] Field of Search ................. 439/49, 684, 675, 714, 439/668, 669, 578, 322, 188, 507

[56] References Cited

U.S. PATENT DOCUMENTS

| | | | |
|---|---|---|---|
| 1,089,343 | 3/1914 | Naylor | 439/188 |
| 1,808,902 | 6/1931 | Mueller | 439/668 |
| 3,537,061 | 10/1970 | Haag et al. | 439/668 |
| 3,784,962 | 1/1974 | Byrd . | |
| 4,368,941 | 1/1983 | Martin | 439/669 |
| 4,423,466 | 12/1983 | Beun . | |
| 4,588,251 | 5/1986 | Newton . | |
| 4,840,568 | 10/1989 | Burroughs et al. | 439/49 |

FOREIGN PATENT DOCUMENTS 2231388 8/1973 Fed. Rep. of Germany ...... 439/669

Primary Examiner—David I. Pirlot
Attorney, Agent, or Firm—Merchant, Gould, Smith, Edell, Welter & Schmidt

[57] ABSTRACT

A telephone jack assembly is disclosed having a frame and a plurality of spring contacts. The plurality of spring contacts include tip and ring contacts and normal spring contacts. The normal spring contacts include body portions and offset portions which are generally parallel to and spaced from one another. The spring contacts and normal spring contacts are carried on said frame for the offset portions of the normal contacts to oppose and abut the spring contacts in their rest positions.

9 Claims, 2 Drawing Sheets

JACK ASSEMBLY

This is a continuation of application Ser. No. 07/452,597, filed Dec. 19, 1989, now abandoned.

BACKGROUND OF THE INVENTION

1. Field of the Invention

This invention pertains to a jack assembly for a telephone communication system. More particularly, this invention pertains to an assembly of novel construction and a method for constructing the same.

2. Description of the Prior Art

Jack assemblies (such as Bantam jacks) for the telephonic communications industry are well known. An example of such is shown in U.S. Pat. No. 4,588,251. Other examples may be found in U.S. Pat. Nos. 4,423,466; 3,784,962; and 4,368,941.

The prior art telephonic communication system jack assemblies are similar in that they have a frame with a forward face and an extending rib. Bores are formed through the face sized to receive a telephone jack plug of predetermined dimensions. A plurality of spring contacts are carried on the rib. The plurality of spring contacts include tip and ring spring contacts associated with each bore.

The tip and the ring spring contacts are positioned to electrically engage the tip and ring, respectively of a plug inserted into the associated bore. When no plug is inserted into the bore, the tip and ring contacts are in rest positions electrically engaging spring contacts carried by the rib. The spring contacts which are engaged by the tip and ring spring contacts in the rest position are respectively referred to as the tip normal spring contact and the ring normal, spring contact.

With perhaps best reference to FIGS. 1-3 of the aforesaid U.S. Pat. No. 4,588,251, the reader will note that the various spring contacts are stacked and separated by insulating spacers. The tip and ring contacts are generally parallel throughout their entire length, except at their distal ends, which engage the tip or ring elements of an inserted plug.

Unlike the tip and ring spring contacts, the normal spring contacts (both the tip normal and ring normal contacts) are bent at the location of the insulating spacers. Accordingly, the normal contacts angle toward the ring and tip contacts.

In practice, the normal spring contacts are prebent in a manufacturing process. However, the bending (usually a stamping process) does not always produce accurate results. Accordingly, the normal contacts may not be accurately bent in order to make the desired electrical connection with the tip and ring spring contacts in the rest positions. As a result, it is necessary to hand-adjust the normal spring contacts and possibly the tip and ring spring contacts to ensure desired performance of the jack assembly.

The hand adjustment of the normal spring contacts significantly increases the manufacturing cost of the jack assembly. In order to reduce the cost of the assembly, it would be desirable to find a technique to eliminate the need for the hand adjustment. Such is the object of the present invention.

SUMMARY OF THE INVENTION

According to a preferred embodiment of the present invention, a jack assembly is disclosed having a plurality of spring contacts connected to a frame. The spring contacts assume a predetermined rest position. A normal spring contact is provided having a body portion and an offset portion, both in generally parallel alignment with the spring contact. The amount of offset is selected for the offset portion to oppose the spring contact when it assumes its normal rest position.

DESCRIPTION OF THE PREFERRED EMBODIMENT

A. Detailed Description of Prior Art

Figure 1:
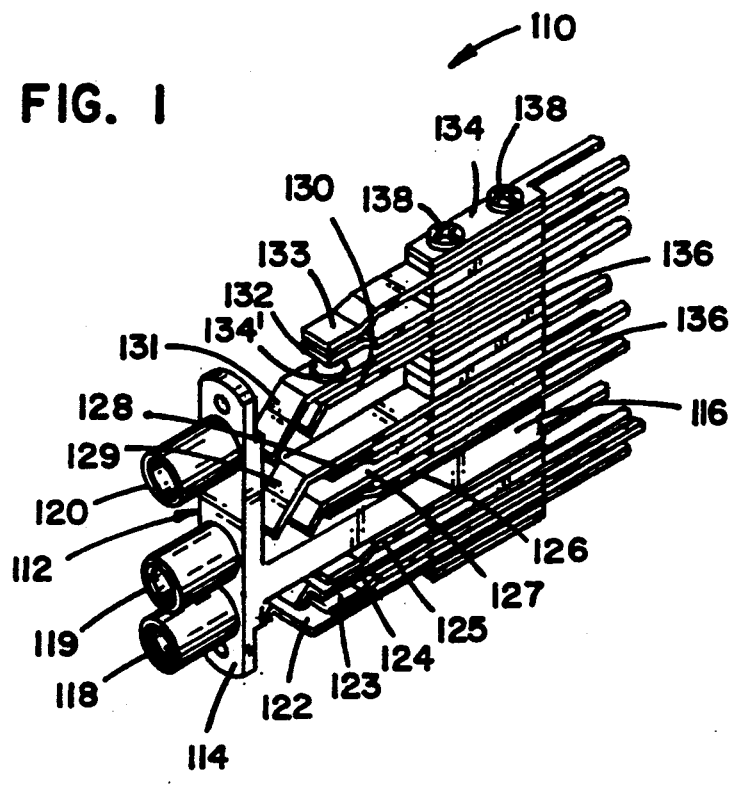
FIG. 1 is a perspective view of a jack assembly according to the invention, with a jack plug shown dissociated from the jack assembly.

For ease of understanding of the structure and scope of the present invention, a detailed description of a prior art jack assembly will now be provided. Accordingly, the reader's attention is directed to FIG. 4, in which a prior art jack assembly 10 is shown. The prior art jack assembly 10 includes a frame 12 having a forward face 14 and a perpendicularly extending rib 16. A plurality of ports 18, 19 and 20 are formed through the forward face 14. The ports include an IN port 18, an OUT port 19, and a MONITOR port 20 (or, more commonly, MON port 20). The ports are sized to receive any one of identical jack plugs 80, 80a, 80b of predetermined dimensions inserted within any of the ports 18, 19, 20. When inserted, the tip and ring contacts (such as contacts 82, 84, respectively) of the plug (80, 80a, 80b) extend through the assembly 10.

A plurality of spring contacts are carried on the rib 16. The plurality of spring contacts includes an IN ring spring 22, an IN ring normal spring 23, an IN tip spring 24, and an IN tip normal spring 25.

The plurality of spring contacts also includes OUT spring contacts. These are an OUT tip normal spring 26, an OUT tip spring 27, an OUT ring normal spring 28, and an OUT ring spring 29.

Finally, the plurality of spring contacts includes MONITOR contacts (or MON contacts) including a MON tip spring 30, a MON ring spring 31, and first and second MON switch contacts 32, 33. A dielectric pusher 34' is carried on MON ring contact 31 to push against first switch contact 32 and urge first switch contact 32 against second switch contact 33 upon insertion of a plug into MON port 20.

It will be noted that each of spring contacts 23, 25, 26, 28, 32 presents a contact pad which opposes a contact pad on opposing spring contacts 22, 24, 27, 29 and 33. Each of the contact pads is identical, and accordingly, only pads 35, 35a on springs 22, 23 are numbered. The pads of opposing spring contacts may be placed at right angles or 45° angles relative to the pads on an opposing spring contact in order to ensure greater contact reliability.

Figure 4:
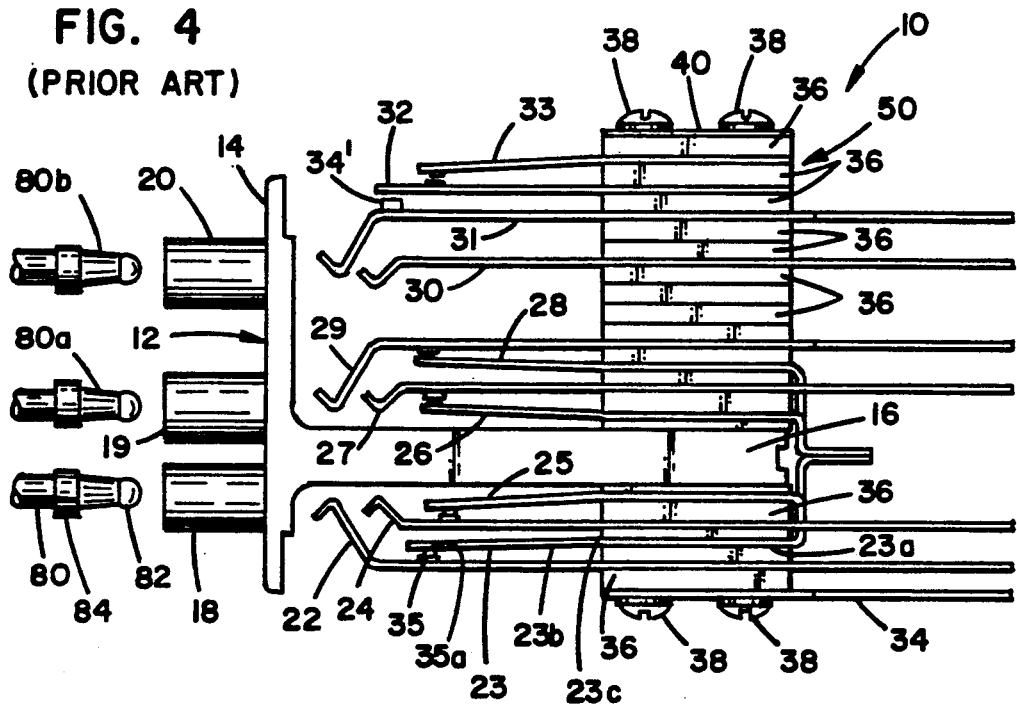
FIG. 4 is a side elevation view of a prior art jack assembly.

The reader will note that the prior art jack assembly 10 of FIG. 4 shows the tip and ring spring contacts (contacts 24, 27, 22 and 29) are generally parallel aligned except for their distal ends (which are bent to engage a tip or ring, respectivly, of an inserted plug).

The various spring contacts 22–33 are stacked in a vertical column 50 and spaced apart by insulating spacers 36. The column of spacers 36 and spring contacts 22–33 are secured to the rib 16 by screws 38. On opposite ends of the stacked array are grounding plates 40, 34 which are electrically connected to frame 12.

As indicated in FIG. 4, the normal spring contacts 23, 25, 26, 28 and the first and second MON switch contacts 32, 33 are all bent at the point of connection to the stacked array 50 of insulating spacers 36. Each of the bends is similar, and a description of IN ring normal spring 23 will suffice as a description of spring contacts 25, 26, 28, 32 and 33.

IN ring normal spring contact 23 includes a main body portion 23a and an angled portion 23b. Body portion 23a is captured between insulating spacers 36 and is parallel to all other spring contacts in the column 50. Angled portion 23b extends at a slight angle from portion 23a at a premanufactured bend point 23c. The bend point 23c is formed by stamping spring contact 23 in the manufacturing process. The bend is necessary such that the pad 35a on the distal end of IN ring normal spring 23 will engage the pad 35 on the IN ring spring 22 when the IN ring spring 22 is in a rest position as shown in FIG. 4.

In forming the bend point 23c, manufacturing variances arise such that an assembled prior art jack 10 will not always have reliable connection between spring contacts 22 and 23. Accordingly, it is required to have a manual adjustment of the angle 23c. This manual adjustment significantly contributes to the cost of manufacture of prior art jack assemblies 10.

B. Novel Structure of the Present Invention

Figure 2:
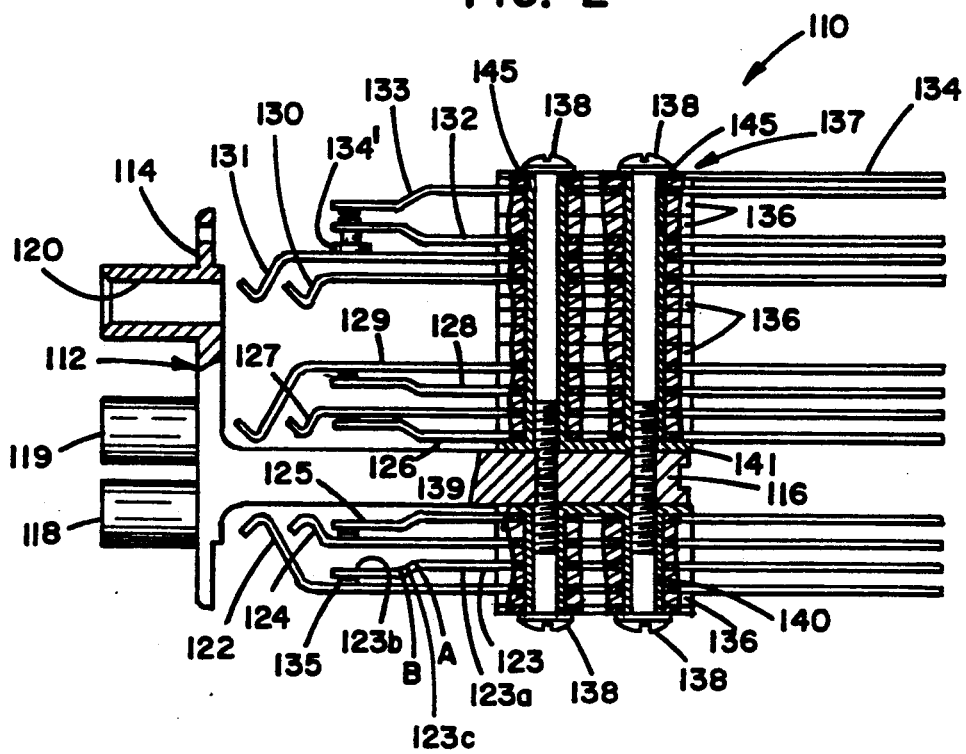
FIG. 2 is a side elevation view of the jack assembly of FIG. 1 shown partially in section.

With initial reference to FIGS. 1 and 2, a jack assembly 110 according to the present invention is shown. Like prior art jack assembly 10, jack assembly 110 includes a frame 112 having a forward face 114 and a perpendicularly extending rib 116.

A plurality of ports including an IN port 118, an OUT port 119 and a MONITOR (or MON) port 120 are formed through the forward face 114. The ports 118, 119 and 120 are sized to receive a jack plug (such as plug 80 of FIG. 4) of predetermined dimensions.

Like the prior art jack assembly 10, the novel jack assembly 110 includes a plurality of tip and ring contacts. The plurality of contacts includes an IN ring spring 122, an IN ring normal spring 123, an IN tip spring 124, and an IN tip normal spring 125.

The plurality of spring contacts also include OUT contacts. These are an OUT tip normal spring 126, an OUT tip spring 127, an OUT ring normal contact 128, and an OUT ring spring 129.

Finally, the novel assembly 110 includes a plurality of monitor contacts including MON tip spring 130, MON ring spring 131 and first and second MON switch contacts 132, 133. A dialectic plunger 134 is carried on MON ring contact 131 to urge switch contact 132 into electrical contact with switch contact 133 upon insertion of plug 80 into port 120. As shown in FIG. 2, each of the contacts 122–129 and 132, 133 are provided with contact pads such as pads 135 which form no part of this invention per se.

The spring contacts 122–133 are stacked in a column 137 with the contacts spaced apart by dielectic spacers 136. A preferred dialectic spacer is formed of polyetherimide resin. Such a resin is available through the General Electric Company under the mark Ultem ® and is described more fully in the brochure of General Electric ULT-201B. Such a resin does not significantly deform under the stress of the spring contacts and is resistant to moisture variations in the environment of the assembly 110. It will be appreciated that the use of such a resin forms no part of this invention per se.

The dialectic spacers 136 and spring contacts 122–133 are maintained in the stacked column 137 by screws 138. As shown in FIG. 2, self tapping screws 138 are threadibly received within bores 139 formed in rib 116. The screws 138 are electrically conductive and engage a grounding plate 134. The electrically conductive screws 138 electrically connect plate 134 to frame 112 to provide grounding of the frame 112.

Figure 3:
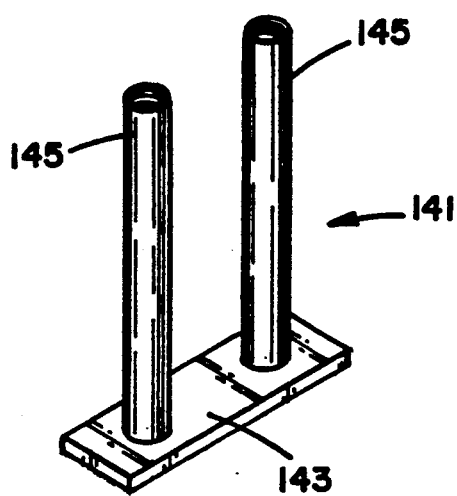
FIG. 3 is a perspective view of an insulating element for use in the construction of the assembly of FIGS. 1 and 2.

The screws 138 are insulated from the spring contacts 122–133 by insulating members 141 and 140. For ease of illustration, member 141 is shown in FIG. 3 and includes a flat, rectangular base 143 and parallel extending tubes 145. Member 141 is integrally formed of insulating material.

Holes are formed in the spacers 136 and aligned with tubes 145 for the spacers 136 to slide over tubes 145. The screws 138 pass through the tubes 145 and connect with rib 116. The spring contacts 122–133 are also provided with holes that slip over tubes 145 so the spring contacts and spacers 136 can be stacked on top of plate 143. It will be appreciated that member 140 is identical to member 141 except that the tubes of member 140 are shorter to accommodate shorter length of the column 137 on the side of member 140.

The reader will note that the spring contact arrangement of FIG. 2 is similar to that of the prior art of FIG. 4 except that the normal spring contacts 123, 125, 126, 128, and switch contacts 132 and 133 differ significantly from prior art spring contact 23, 25, 26, 28, 32 and 33. Specifically, the contacts of the novel assembly 110 do not include the single bend such as bend 23c. Instead, the present invention is the incorporation of offset spring contacts 123, 125, 126, 128, 132 and 133. Since the offset nature of each of the spring contacts is the same, a description of spring contact 123 will suffice as a description of spring contacts 125, 126, 128, 132 and 133.

The reader will note that contact 123 has a body portion 123a which is parallel to ring contact 122. Also parallel to ring contact 122 is a contact portion 123b. Portions 123a and 123b are joined by an angled portion 123c. Angled portion 123c connects to portions 123a and 123b at angled bends A and B, each of which bend at the same angle (preferably about 30°). The length of angled portion 123c is selected such that contact portion 123b in a rest position opposes movement of spring contact 122 to its rest position. Angles A and B are sharper than angles 23 and are formed through progressive stamping of the spring contact 123. As a result of the progressive stamping and the offset contact portion 123b, there is reduced variance in the manufacturability of the assembly 110. This eliminates the need for manual adjustment of any of contacts 123, 125, 126, 128, 132 or 133. Accordingly, a significant contributor to the manufacturing cost of the prior art assembly 10 is avoided in the manufacture of the assembly 110.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention. Thus, the scope of the invention is intended to be limited only by the scope of the claims as are, or which may hereafter be, appended hereto.

We claim:

1. A telephone jack assembly comprising:
a frame;
a spring contact connected to said frame to assume a predetermined rest position with a contact end disposed to engage a plug and with said spring contact urged by insertion of a plug into said frame to be moved from said predetermined rest position to a predetermined displaced position;
a normal contact having a body portion connected to said frame and having a pre-formed offset portion connected to said body portion, said offset portion spaced from and generally parallel to said body portion, said normal contact disposed on said frame to have a rest position selected for said offset portion to oppose and physically abut said spring contact at a point of contact and space said spring contact, against its bias, from said predetermined rest position, said normal contact further disposed for said offset portion to be spaced from and out of electrical signal transmitting contact with said spring contact when said spring contact is in said predetermined displaced position;
said frame including a dielectric spacer having a predetermined dimension, said spring contact and said normal contact connected to said spacer with a resulting compression force with said spacer disposed between said spring contact and said body portion and with said spacer maintaining a separation between said spring contact and body portion equal to said dimension, said spacer formed from a material non-compressible in response to said compression force upon connection of said spring contact and normal contact to said spacer; and
said spring contact connected to said frame in a cantilevered connection and unsupported by said frame at said point of contact when said spring contact is in said displaced position.

2. An assembly according to claim 1 wherein said spring contact and normal contact are stacked in generally parallel spaced-apart alignment with said offset and body portions parallel to said spring contact.

3. An assembly according to claim 2 wherein said offset portion and said body portion are connected by an angled portion disposed at an angle to each of said offset and body portion,
and wherein said spring contact is one of a plurality of spring contacts including tip and ring springs selected to engage a tip and ring of a plug, said normal contact is one of a plurality of normal contacts including a tip normal spring and a ring normal spring, said tip normal spring disposed to engage said tip spring and said ring normal spring disposed to engage said ring spring.

4. An assembly according to claim 3 wherein said plurality of contacts include two sets of tip and ring springs, including an IN set and an OUT set.

5. An assembly according to claim 2 wherein said spring contact and said normal contact are maintained in spaced-apart relation by a dielectric spacer.

6. An assembly according to claim 5 wherein said dielectric spacer is formed of polyetherimide resin.

7. A method of constructing a telephone jack assembly including forming a spring contact having a generally flat body terminating at a contact tip;
pre-forming a normal contact with a body portion and an offset portion connected to said body portion, said offset portion spaced from and generally parallel to said body portion;
assembling said spring contact and said normal contact to a frame with said spring contact disposed to assume a predetermined rest position and further disposed to be urged by insertion of a plug into said frame to be moved from said rest position to a predetermined displaced position, said normal contact disposed on said frame to have a rest position selected for said offset portion to oppose said spring contact in electrical signal transmitting contact, and resist movement of said spring contact toward said predetermined rest position;
during said assembly, providing a dielectric spacer having a predetermined dimension with said spacer selected of material non-compressible in response to a compression force resulting from connection of said spring contact and said normal contact to said spacer and securing said spring contact and said normal contact to said spacer with said spacer disposed between said flat body and said body portion to maintain said flat body and said body portion spaced apart by said dimension.

8. A method according to claim 7 wherein said normal contact is formed by progressively stamping a blank to include at least two offsetting angles to form said offset portion and said body portion.

9. A telephone jack assembly comprising:
a frame;
a plurality of spring contacts connected to said frame;
said plurality including at least a first and a second spring contacts with at least of said first and second spring contacts disposed to be urged from a predetermined rest position to a predetermined displaced position upon insertion of a plug into said jack assembly;
said first spring contact having a body portion connected to said frame and a pre-formed offset portion connected to said body portion, said offset portion spaced from said body portion, said first spring contact disposed on said frame for said offset portion to oppose said second spring contact in electrical signal transmitting contact with both of said first and second spring contacts urging one another against this respective bias away from their respective rest positions and further disposed for said offset portion to be spaced from said second spring contact when said at least one contact is in said displaced position;
said frame including a dielectric spacer having a predetermined dimension with said spacer formed from a material non-compressible in response to a compression force resulting from connection of said spring contacts to said frame, said second spring contact and said body portion connected to said spacer with said spacer disposed between said body portion and said second spring contact and with said spacer maintaining a separation between said second spring contact and said body portion equal to said dimension; and
said at lest one of said first and second spring contacts connected to said frame in a cantilevered connection and unsupported by said frame at said point of contact when said at least one of said first and second spring contacts is in said displaced position.

* * * * *

UNITED STATES PATENT AND TRADEMARK OFFICE
CERTIFICATE OF CORRECTION

PATENT NO. : 5,145,416
DATED : September 8, 1992
INVENTOR(S) : Thomas W. Cruise, et al.

It is certified that error appears in the above-identified patent and that said Letters Patent is hereby corrected as shown below:

Column 2, line 68, "24,27,22 and 29)" should be --22,24,27 and 29)--;

Column 3, line 7, "40,34", should be --34,40--;

Column 3, lines 67 and 68, "dielectic" should be --dielectric--;

Column 4, line 2, "mark" should be --trademark--;

Column 4, line 9, "dialectic" should be --dialectric--;

Column 4, line 18, "141 and 140." should be --140 and 141--;

Column 6, line 35, "contacts" should be --contact--; and

Column 6, claim 9, line 64, "lest" should be --least--.

Signed and Sealed this

Second Day of November, 1993

Attest:

BRUCE LEHMAN

Attesting Officer        Commissioner of Patents and Trademarks